June 2, 1964     O. B. HARMES     3,135,342
WEIGHING DEVICE
Filed Aug. 28, 1962     3 Sheets-Sheet 1
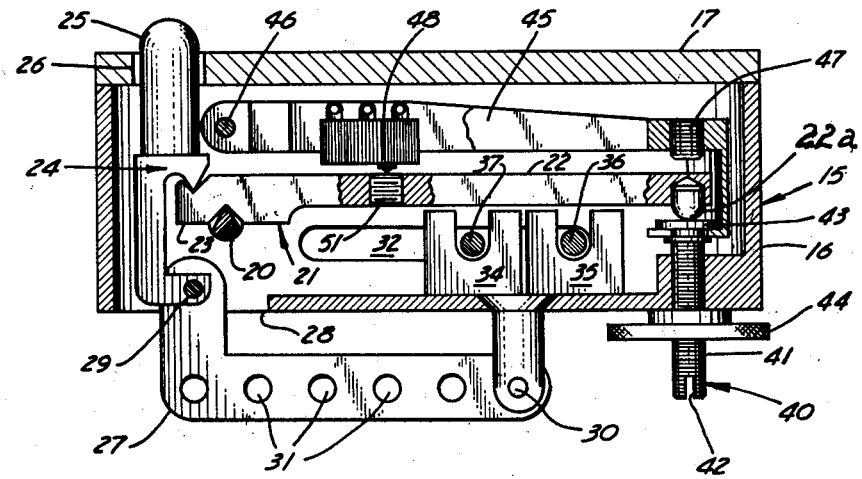
Fig-1-
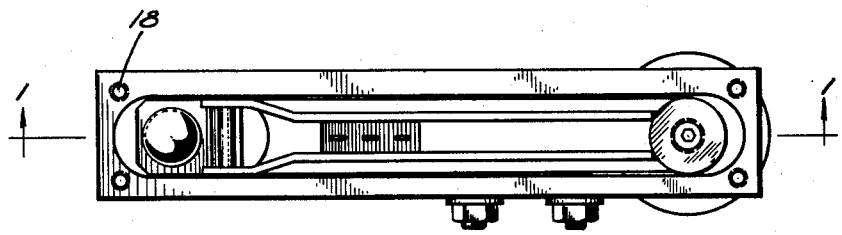
Fig-2-
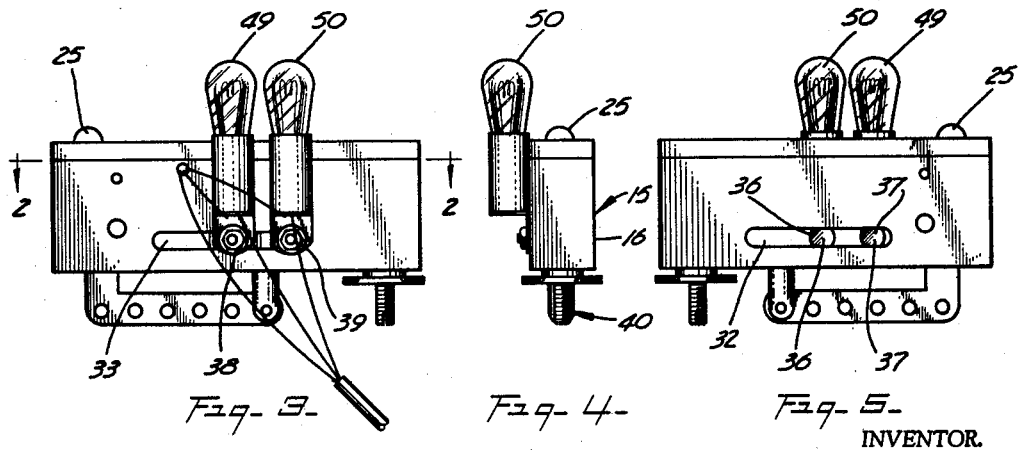
Fig-3-    Fig-4-    Fig-5-
INVENTOR.
OREN B. HARMES
BY Everett J. Schroeder
Kenneth D. Siegfried
ATTORNEYS June 2, 1964 — O. B. HARMES — 3,135,342
WEIGHING DEVICE
Filed Aug. 28, 1962 — 3 Sheets-Sheet 2
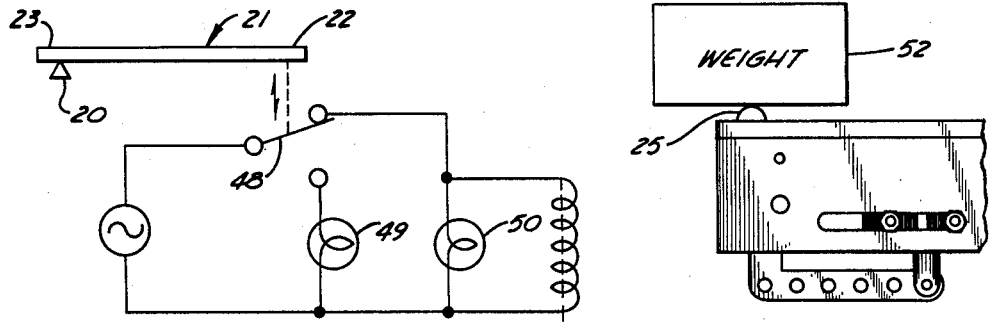
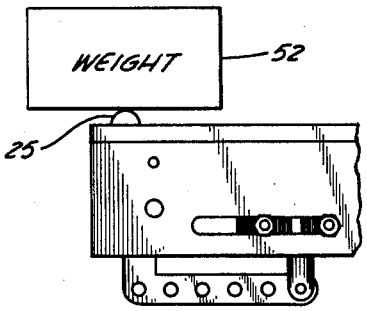
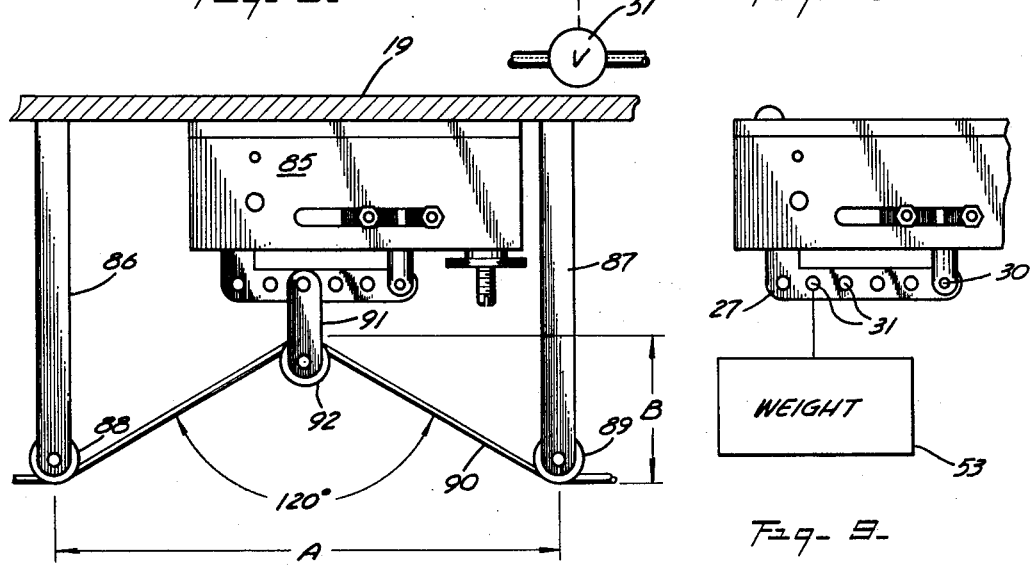
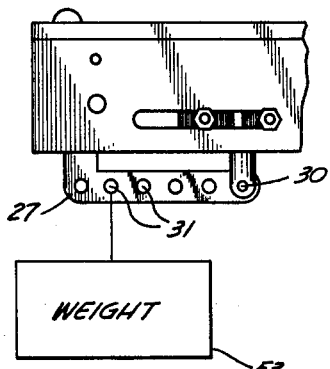
$B = \frac{A}{2} \times .57735$
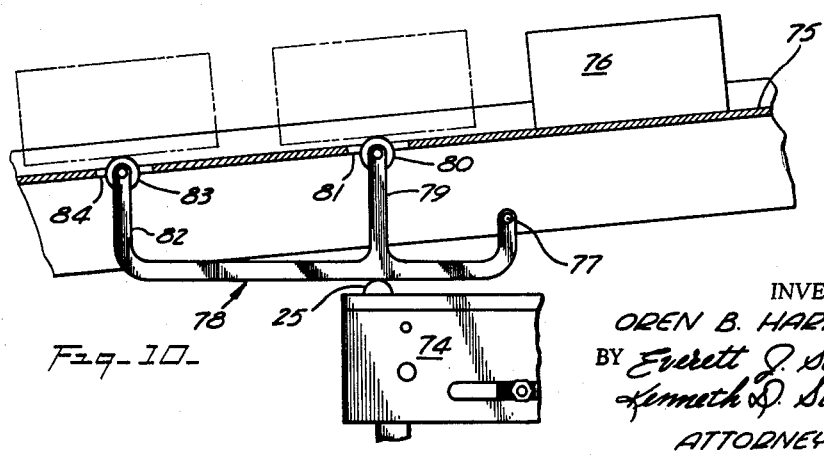
INVENTOR.
OREN B. HARMES
BY Everett J. Schroeder
Kenneth D. Siegfried
ATTORNEYS

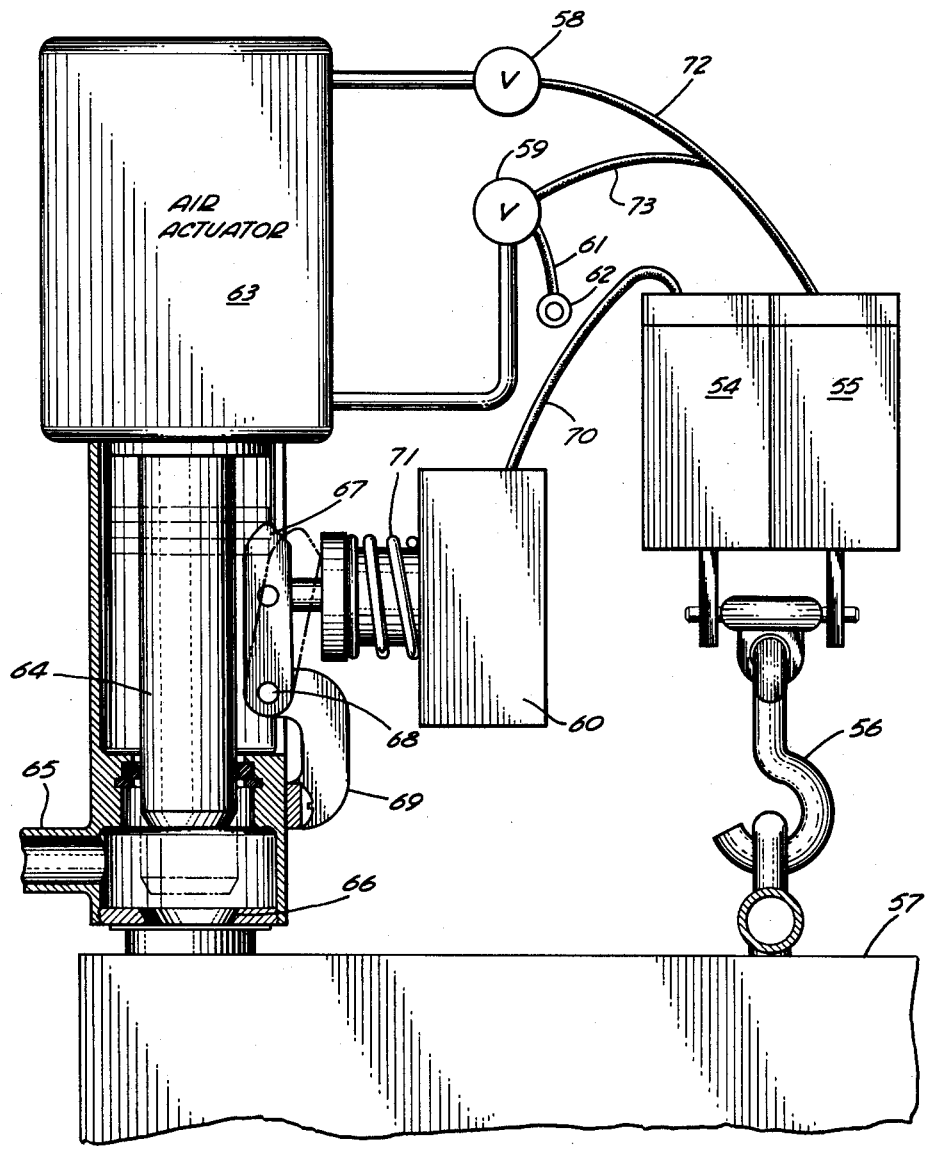
Fig-7-

United States Patent Office 3,135,342
Patented June 2, 1964

3,135,342
WEIGHING DEVICE
Oren B. Harmes, Algona, Iowa
Filed Aug. 28, 1962, Ser. No. 219,891
31 Claims. (Cl. 177—48)

This invention relates to weighing devices. More particularly it relates to devices designed to indicate when a certain weight has been exceeded as in container filling apparatus, batch mixing, and the like.

Various devices have been designed in the past for the purpose of weighing containers, etc. as they are filled so as to insure they are adequately filled and yet avoid waste attendant with filling to an excess degree. A conventional device of this type is a platform scale of one variation or another. Such devices have certain disadvantages inherent in their construction for the sensory portions thereof, such as a spring, tend to deform because of material fatigue and cannot be as accurate as desired. Moreover, their range is limited, their size is bulky, they are expensive to manufacture and assemble, and they need frequent maintenance, service, and repair. My invention is directed to eliminating each of these disadvantages and at the same time providing a simple device capable of sensing forces of all types, including weight.

It is a general object of my invention to provide a novel and improved force sensing device of simple and inexpensive construction and operation.

A more specific object is to provide a novel and improved force sensing device which can be manufactured simply and inexpensively and yet performs equally well over extended periods far exceeding those of other devices previously known and used for such purposes.

Another object is to provide a novel and improved simple and inexpensive force sensing device capable of maintaining unusually high accuracy in performance over extremely long periods of time.

Another object is to provide a novel and improved force sensing device comprised of a minimum of parts which are nevertheless of simple and inexpensive construction.

Another object is to provide a novel and improved force sensing device capable of measuring accurately and without alteration or adjustment, forces of either suspension or compression type.

Another object is to provide a novel and improved force sensing device of simple and inexpensive construction capable of being utilized without modification and with advantage in an over and under weighing arrangement, as a tension indicater and regulator, as an automatic batch mixing control, and in many other capacities where measurement of a given force is required.

Another object is to provide a novel and improved force sensing device which is highly and equally accurate whether at minimum or maximum force values.

Another object is to provide a novel and improved force sensing device having inherent control means adapted to control associated valves or electrical apparatus in such a manner as to cause a desired action to automatically take place upon the force value being sensed thereby reaching a predetermined value.

Another object is to provide a novel and improved force sensing and indicating device capable of quick, simple, and inexpensive adjustment so as to vary the force required to cause the device to indicate the application of such a force thereupon.

Another object is to provide a novel and improved force sensing device readily adaptable for use in feeding operations wherein accurate measurements of the amount being fed is required and hence dribble feed tactics are utilized.

These and other objects and advantages of my invention will more fully appear from the following description, made in connection with the accompanying drawings, wherein like reference characters refer to the same or similar parts throughout the several views, and in which:

FIG. 1 is a front elevational view of one embodiment of my invention with the adjacent sides of the housing thereof removed and with portions broken away to better illustrate the construction thereof, the view being taken approximately along line 1—1 of FIG. 2, FIG. 2 is a top plan view of the embodiment shown in FIG. 1 with the top cover plate removed, the view being taken approximately along line 2—2 of FIG. 3, FIG. 3 is a front elevational view of the embodiment shown in FIGS. 1 and 2 with the light indicia attached thereto, FIG. 4 is an end elevational view of the embodiment shown in FIG. 3, FIG. 5 is a rear elevational view of the embodiment shown in FIG. 3, FIG. 6 is a schematic wiring diagram of the indicia system shown in FIGS. 3–5 in combination with a solenoid valve, FIG. 7 is a side elevational view of a pair of weight or force sensing devices of the type disclosed in FIGS. 1–3 arranged in tandem and in combination with a feeding mechanism involving a dribble feed, all on an enlarged scale, FIG. 8 is a partial front elevational view of a force sensing device such as is shown in FIGS. 1–3 with the force transmitting element supporting a weight member, FIG. 9 is a partial front elevational view of a force sensing device of the type shown in FIGS. 1–3 with a weight suspended from the lever arm connecting to the force transmitter, FIG. 10 is a partial front elevational view of a force sensing device of the type shown in FIGS. 1–3 illustrating the application thereof to an over and under weighing function, and FIG. 11 is a front elevational view of my force sensing device illustrating its application to a tension sensing function.

The preferred embodiment of my invention, as shown in FIGS. 1–3 includes a frame indicated generally by the numeral 15 and including a housing member 16 having a removable cover member 17 held by screws (not shown) which thread into threaded apertures such as indicated by the numeral 18 at the upper corners of the housing 16. The frame 15 is adapted to be mounted in supported relation as by support means 19 (shown in FIG. 11). The support of the frame 15 may be accomplished by bolts extending through holes (not shown) formed in the cover member 17.

Carried by the frame 15 is a fulcrum member 20. As best shown in FIG. 1 this fulcrum extends between the side walls of the frame 15 and supports a balance beam member 21 in free pivoting relation. The balance beam 21 has a long end portion or lever arm 22 and a short end portion or lever arm 23.

A force applicator indicated generally by the numeral 24 engages the shorter end portion 23 of the balance beam 21 as best shown in FIG. 1 and includes a force transmitting element 25 which extends upwardly through an opening 26 provided therefor in the cover member 17. An L-shaped lever member 27 is disposed below the fulcrum 20 and extends upwardly through an opening 28 in the bottom of the housing 16 and is pivotally connected by a pivot pin 29 to the force applicator element 24. It will be noted that the L-shaped lever member 27 extends exteriorly of the frame 15 and is pivotally connected to the frame 15 by a pivot pin 30 as well as to the force transmitting element as hereinbefore described. A plurality of openings 31 are formed through the lever member 27 as best shown in FIG. 1 and constitute load attaching means for connecting a load to be weighed at different points along the length of the lever member so as to vary the effect of the load upon the force applicator element 24.

A pair of slots 32 and 33 are formed in the opposite side walls of the housing 16 and are disposed oppositely and parallel to each other as shown in FIGS. 1, 3 and 5. These slots extend longitudinally of the beam balance 21 and adjustably support a pair of permanent magnets 34 and 35. These magnets are preferably of the improved permanent magnet type which have outstandingly long lasting qualities such that their strength does not vary despite prolonged usage over extended periods of time.

The permanent magnets 34 and 35 are independently adjustable longitudinally of the slots 32 and 33. Securing means in the form of bolts 36 and 37 and nuts 38 and 39 are utilized to hold the permanent magnets 34 and 35 in any desired position to which they may be moved longitudinally of the beam balance 21.

The longer end portion 22 of the beam balance 21 is magnetically permeable and disposed opposite the magnets 34 and 35 so as to be attracted downwardly thereby. In this manner, the beam balance 21 is urged against pivotal movement about the fulcrum 20 in opposition to any weight or force applied to the shorter lever arm 23 of the beam balance 21 by a force applied to the lever arm 27 or a weight applied to the force transmitter 25.

Adjustable spacing means indicated generally by the numeral 40 extends through the housing 16 and bears against a ball-like member 22a carried by the outer end portion of the longer lever arm 22 of the beam balance 21. This can best be seen by reference to FIG. 1. It will be noted that the adjustable spacing means includes a threaded shaft or screw member 41 which extends through the housing 16 and threadedly engages the same so that rotation thereof about its longitudinal axis through the use of a screwdriver engaging its kerf 42 will cause the shaft 41 to move inwardly or outwardly relative to the housing, depending upon its direction of rotation. The inner end of the shaft 41 has a head member 43 which bears against the ball-like member 22a. A lock nut 44 is utilized to hold the shaft in the adjusted position once the necessary adjustment of the spacing between the permanent magnets 34 and 35 and the lever arm 22 have been accomplished.

A mounting bracket 45 is pivotally mounted at one of its ends upon the interior of the housing 16 by means of a pivot pin or post 46. The opposite end of the bracket 45 is U-shaped and is secured to the head member 43 of the shaft 41 by a retaining ring as best shown in FIG. 1 so that as the shaft moves upwardly the end of the mounting bracket 45 moves upwardly therewith and similarly, when the shaft 41 is moved downwardly relative to the housing the attached end of the bracket 45 moves downwardly therewith. The U-shaped end portion of the mounting bracket 45 carries adjustable movement-limiting means for the longer end portion 22 of the beam balance 21 in the form of a threaded abutment 47 which can be adjusted upwardly or downwardly relative to the beam balance by rotation thereof about its longitudinal axis since it is provided with a kerf (not shown) similar to the kerf 42 of the shaft 41. This abutment member 47 is adjusted to limit the extent of upward movement of the longer end portion of the lever 21 upwardly in order to prevent abuse to a switch member 48 which is carried by the bracket 45 immediately above the medial portion of the beam balance 21. This switch 48 is positioned, as shown, in very close proximity to the beam balance 21 so that any appreciable upward movement thereof will actuate the switch element. This switch element 48 together with a pair of electric lamps 49 and 50 constitute indicator means for indicating the movement of the longer lever arm 22 away from the permanent magnets 34 and 35.

The beam balance 21 carries adjustment means 51 in the form of a threaded member positioned immediately below the switch element 48 so that the extent of movement permissible by the beam balance 21 prior to actuation of the switch element 48 may be varied as desired.

FIG. 6 illustrates the wiring system for the two lamps 49 and 50. Thus it will be seen that when the longer lever arm 22 of the beam balance 21 actuates the switch 48, the lamp 50 will be deenergized and the lamp 49 will be energized. FIG. 6 shows this system schematically hooked up with a solenoid valve 51 so that the valve will be in open position so long as the switch 48 is not actuated but upon actuation thereof by the beam balance 21, the valve 51 will be moved to closed position and that fact will be signified by the lighting of the lamp 49.

FIG. 8 illustrates how my force sensing device may be utilized as a weighing device for the weight indicated by the numeral 52 is applied to the force applicator 25 and as the weight increases to exceed a predetermined amount, the beam balance 21 will be caused to pivot about the fulcrum 20 to energize the switch 48 and cause the lamp 49 to be energized and the lamp 50 to be deenergized. The switch 48, as shown, is of the single-pole double-throw type.

FIG. 9 illustrates my force sensing device utilized to sence a force through application to the lever arm 27 by means of a weight 53 attached to one of the attaching means 31. It will be readily recognized that the weight at which the beam balance 21 will be released by the permanent magnets 34 and 35 for a given position of the latter may be readily varied by attaching the weight or force to be measured at different points along the length of the lever arm 27 by way of the attaching means 31. Thus the closer the weight is attached to the pivot 30, the greater the weight will have to be to cause the beam balance 21 to be released by the permanent magnets 34 and 35. In practice, the openings 31 may be positioned and the magnets 34 and 35 adjusted so as to cause the beam balance to be released at various multiples of a given force or weight or at different values thereof.

It should be noted that the lever arm 27 such as is shown in FIG. 9, may be extended to the left as viewed in FIG. 9 to any desired length and the further that the weight 53 is attached to one of the attachment means 31 away from the pivot 30, the more sensitive the entire device becomes to the weight 53. Similarly, the closer the weight 53 is attached to the pivot 30, the greater the weight 53 will be required in order to cause the beam balance to be moved away from the permanent magnets 34 and 35 and actuate the switch element 48.

FIG. 7 illustrates an application of my invention to a system permitting high velocity feeding and/or batch mixing. FIG. 7 shows two of my force sensing devices 54 and 55 of the type shown in FIG. 1 connected in tandem so as to support a hook member 56 which in turn supports a container 57. The sensing device 55 is set slightly lower than the device 54 so that it will actuate its switch element shortly prior to the amount of desired material having been introduced into the container 57. These sensing devices 54 and 55 are electrically connected, as shown, to a pair of valves 58 and 59 and a solenoid 60. The valve 59 is electrically connected by an electric line 61 to a manual switch 62. This valve 59 is connected to a source of compressed air (not shown) and brings the same into communication with an air actuator 63 which is actually comprised of a piston and cylinder connected to an elongated valve element 64. The valve element 64 may be of a conventional type moveable between open, intermediate, and closed positions so as to permit a dribble feed at the intermediate position. As viewed in FIG. 7 the valve is shown in open position which is the position it will assume immediately after the valve 59 having been actuated by closing of the manual switch 62. When in this position the material to be fed into the container 57 can be introduced through the feed line 65 and will flow in past the valve seat 66 into the container.

As the material flows into the container 57, the weight thereof, of course, increases until finally the beam balance 21 of the sensing device 55 will swing away from its permanent magnets and actuate its electrical switch element 48. This causes valve 58 which likewise is connected to the source of compressed air and to the air actuator 63, as shown, to be actuated and introduce compressed air at the opposite end of the air actuator 63 so as to cause the valve element 64 to move to the intermediate position shown in broken lines in FIG. 7. The downward movement of the valve element 64, however, is arrested by a stop element 67 which consists of a toggle member pivotally mounted at 68 upon a bracket 69. The material will continue to flow through the conduit 65 into the container 57 until the desired weight has been attained and at that point the device 54 will trigger its electrical switch element 48 and by means of its electrical line 70 will energize the solenoid 60 to cause the spring 71 to be compressed and draw the stop element 67 to the broken line position shown in FIG. 7. This will permit the valve element 64 to be moved to the closed position against the valve seat 66 and thereby instantaneously cut off the flow of material into the container.

When a new container has been substituted the entire high velocity feeding operation may be repeated by pressing the manual switch 62 to cause the valve 59 to again lift the valve element 64 to its open position. When this occurs the spring 71 will cause the stop element 67 to again immediately return to its solid line position shown in FIG. 7 for the sensing devices 54 and 55 will have automatically reset themselves because of the close proximity in which the lever arm portion 22 of the beam balance is positioned relative to the permanent magnets 34 and 35. Consequently the circuit to the solenoid 60 will have been broken and the action of the spring 71 will return the stop element 67 to the position shown.

It will be noted that the sensing device 55 is connected to the valve 58 by an electrical line 72 and also to the valve 59 by a branch line 73. The valve 59 is connected through the sensing device 55 in this manner so as to cause the valve 59 to shift to a position such as to permit the air supporting the piston and valve element in open position to escape as the piston is driven downwardly by the air introduced through the valve 58.

It should be noted that this type of arrangement as described immediately hereinbefore may also be utilized for automatic batch weighing for the two sensing elements 54 and 55 can equally well be connected to separate sources of supply and separate valves which will introduce predetermined amounts of different materials into the container 57.

FIG. 10 shows the application of my invention to an over and under weighing function. As shown, a sensing device 74 of the type disclosed in FIGS. 1–3 is supported directly beneath the chute 75 along which a plurality of containers 76 will pass because of the incline of the chute. Pivotally mounted as at 77 beneath the chute 75 is a lever arm 78. As shown, this lever arm is supported by the chute structure but, of course, it may be supported by any rigid support. This lever member 78 rests upon the force transmitter 25 in supported relation. Extending upwardly from the medial portion of the lever 78 is an arm 79 which supports a roller 80 which in turn extends upwardly through the bottom of the chute 75 through an opening 81 provided therefor. It will be noted that the roller 80 extends slightly above the upper surface of the bottom of the chute so that as the container 76 passes thereacross, the weight thereof will be supported by the roller 80.

At a point further removed from the axis of pivot 77 along the length of the lever member 78 is a second support arm 82 which carries a roller 83 extending upwardly through the bottom of the chute 75 through the opening 84 provided for that purpose. The roller 83 is positioned such that the container 76 must pass thereover so that the weight thereof will be borne by the roller.

The sensing device is set in such a manner that the container 76 which carries the desired weight will be insufficient as it passes over the roller 80 to depress the force transmitter 25 and cause the lamp 50 to be deenergized. Consequently, if a given container does cause the lamp 50 to be deenergized the observer is immediately appraised thereby that the container is considerably overweight.

The lever arm supporting the roller 83 is of such length that a container 76 which does contain the prescribed weight of material will cause the force transmitter 25 to be depressed and thereby cause the lamp 49 to be energized. Consequently, if the lamp 49 is not energized as the container passes over the roller 83, the observer is immediately appraised that the container is substantially underweight for the sensing device 74 is set so as to release at a weight slightly in excess of the prescribed weight. From this it can be seen that I have provided a very simple over and under weighing arrangement which will immediately appraise the observer of either of the two undesirable conditions. It will be appreciated, of course, that in lieu of the lamps, an audible signal system could be equally well utilized.

FIG. 11 shows the application of my invention to a tension sensing function. As shown, a sensing device 85 is supported by the support 19 from which a pair of laterally spaced arms 86 and 87 depend at opposite sides of the sensing device. Each of these arms has a roller 88 and 89, respectively carried at its outer end so that the cable, thread, or other element 90 which is to be tested may pass thereacross. As shown, a supporting bracket or yoke 91 supports a sheave 92 so that the element to be tested may be threaded thereacross intermediate the two rollers 88 and 89. The relationship between the vertical distance between the rollers and the sheaves and the horizontal spacing of the rollers has been illustrated.

With the arrangement shown in FIG. 11 it is possible to constantly sense the tension applied to the element 90 so as to be sure to be appraised if the desired tension is ever exceeded for when the desired tension is exceeded, assuming the sensing device 85 has been properly set, that fact will be called to the attention of the observer by the lighting of the lamp 49.

From the above it can be seen that I have provided a novel and improved force sensing or weighing device of simple and inexpensive construction and operation and increased accuracy. It will be noted that the use of the two permanent magnets 34 and 35 which are independently adjustable adds a much greater range and greater versatility to the device than would otherwise be possible. Moreover, the use of the openings 31 in the lever arm 27 which are spaced at various distances from the axis of pivot 30 also increases the range and versatility of the device for the openings 31 can be disposed at the points necessary so that various size containers may be supported by the device to automatically weigh out the amount of material desired to be packaged in such a container. Thus a given sensing device can be set and utilized for a plurality of containers of various sizes.

It will also be noted that my sensing device is equally adaptable for use in conjunction with suspended weights as well as forces of a compression nature for in the latter case the force is applied to the force transmitter 25 while in the former, they are connected to the lever member 27.

It will be noted that the switch element 48 is disposed in spaced but very close proximity to the lever arm 22 of the beam balance 21. Thus the switch element 48 has no function with respect to preventing movement of the beam balance 21 away from the permanent magnets 34 and 35. However, the slightest movement away from the permanent magnets 34 and 35 causes the effect of these magnets to be diminished and consequently any slight movement away from these magnets immediately results in a complete movement sufficient to engage and actuate the switch element 48. As previously pointed out, the force with which the magnets 34 and 35 hold the beam balance 21 may be varied by spacing the lever arm 22 from the permanent magnets through manipulation of the space adjustment means 40.

Adjustment of the element 47 limits the extent of movement of the beam balance 21 so as to avoid damage to the switch element 48 and also facilitate resetting of the beam balance to the initial position at which the maximum effect of the magnets 34 and 35 will be felt thereupon.

One big advantage of my weighing device is that it will weigh extremely accurately and, in addition, will maintain that accuracy over extremely extended periods. This is true because there is no material fatigue involved in the resistance offered to the weight and consequently the inherent inaccuracies which are introduced as a result of material fatigue in other weighing devices is absent from my weighing device. It will also be noted that my sensing device is comprised of a minimum of parts which are, nevertheless, simple and inexpensive. It will also be noted that my weighing device has great versatility and adaptability for a large number of usages such as tension indicator and regulator, weighing device, automatic batch mixing control systems, over and under weighing systems, high velocity feed systems, etc.

It will, of course, be understood that various changes may be made in the form, details, arrangement and proportions of the parts without departing from the scope of my invention which consists of the matter shown and described herein and set forth in the appended claims.

What is claimed is:

1. A force sensing device comprising:
   (a) a frame adapted to be held in supported relation,
   (b) a fulcrum mounted on said frame in supported relation,
   (c) a balance beam mounted on said fulcrum in superimposed and supported relation at a point intermediate the ends of said beam,
   (d) a force applicator engaging one end portion of said beam and urging it downwardly towards rotation about said fulcrum,
   (e) said applicator including a force transmitting element extending upwardly above said frame,
   (f) a lever member pivotally mounted upon said frame and extending therebelow,
   (g) said lever member being pivotally connected to said force applicator at a point along the length of said lever member removed from its point of pivotal connection to said frame, said lever member being adapted to have a load connected thereto,
   (h) and permanent magnetic means fixedly mounted adjacent and below the opposite end portion of said beam,
   (i) said opposite end portion having a magnetically permeable portion disposed opposite said magnetic means whereby the latter urges said opposite end portion downwardly towards rotation in an opposite direction about said fulcrum.

2. The structure defined in claim 1, and
   (j) indicator means associated with said balance beam in close movement-sensing activated relation thereto whereby only slight upward movement of said opposite end portion will actuate said indicator means.

3. A force sensing device comprising:
   (a) a frame adapted to be held in supported relation,
   (b) a fulcrum supported by said frame,
   (c) a balance beam pivotally mounted at a point intermediate its ends upon said fulcrum,
   (d) a force applicator engaging one end portion of said beam and urging said beam against said fulcrum and towards rotation thereabout in a predetermined direction,
   (e) a lever member connected at one of its end portions to said force applicator and extending outside said frame and having its opposite end portion pivotally mounted at a fixed position, with respect to said applicator,
   (f) said lever member being adapted to have a load connected thereto for measurement of the same,
   (g) and permanent magnetic means fixedly mounted adjacent the opposite end portion of said beam and urging the same to rotate in an opposite direction about said fulcrum,
   (h) said opposite end portion of said beam having a magnetically permeable portion disposed opposite said magnetic means.

4. The structure defined in claim 3 wherein said lever member is pivotally mounted on the exterior of said frame.

5. The structure defined in claim 3,
   (i) switch means mounted adjacent said opposite end portion of said balance beam in position to be actuated thereby when said opposite end portion moves away from said magnetic means, and
   (j) an electrically controlled valve electrically connected with said switch to cause the same to close when said switch is so actuated.

6. The structure defined in claim 3 wherein said lever member has a plurality of load-attaching means positioned at various points along the length of said lever member.

7. The structure defined in claim 3, wherein said permanent magnetic means includes a pair of permanent magnets adjustably mounted on said frame for separate movement to a plurality of fixed positions along the length of said lever member toward or away from said fulcrum as desired.

8. The structure defined in claim 3 and adjustable spacing means carried by said frame and engaging said lever for varying the space between said magnetically permeable portion of said lever member and said magnetic means.

9. The structure defined in claim 3 and electrical indicator means positioned adjacent said opposite end portion of said lever member and in position to be actuated thereby as a result of movement of said opposite end portion in a direction opposite to that in which the same is urged by said magnetic means.

10. The structure defined in claim 3 and adjustable movement limiting means carried by said frame adjacent said opposite end portion of said lever member whereby the extent of movement of said opposite end portion away from said magnetic means may be restricted.

11. The structure defined in claim 9 and adjustment means carried by said lever member opposite said indicator means for adjusting the extent of movement of said indicator means by said lever member when said opposite end portion moves away from said magnetic means.

12. A force sensing device comprising,
   (a) a frame adapted to be held in supported relation,
   (b) a fulcrum supported by said frame,
   (c) a balance beam pivotally supported at a point intermediate its ends by said fulcrum and unsecured relative to said frame,
   (d) a force applicator engaging one end portion of said beam and urging said beam against said fulcrum to urge its associated beam end portion to rotate about said fulcrum in a given direction,
   (e) and permanent magnetic means fixedly mounted adjacent the opposite end portion of said beam and urging the same to rotate in an opposite direction about said fulcrum,
   (f) said opposite end portion of said beam including a magnetically permeable element disposed opposite said magnetic means, (g) and adjustable spacer means engaging said beam and determining the spacing between said magnetic means and said permeable element whereby the extent of urging of said magnetic means upon said permeable element may be varied.

13. A force sensing device comprising,
(a) a fulcrum,
(b) a balance beam pivotally supported by said fulcrum in unsecured relation thereto at a point intermediate the ends of said beam,
(c) a force applicator engaging one end portion of said beam and urging said beam against said fulcrum and toward rotation thereabout in a predetermined direction,
(d) and permanent magnetic means fixedly mounted adjacent the opposite end portion of said beam and urging the same to rotate in an opposite direction about said fulcrum,
(e) said opposite end portion of said beam including a magnetically permeable element disposed opposite said magnetic means,
(f) and electrical warning mechanism associated with said beam balance in actuated relation, said mechanism including an actuating portion disposed adjacent said beam balance in position to be actuated thereby upon rotation of said beam balance in such predetermined direction.

14. A force sensing device comprising,
(a) a fulcrum,
(b) a balance beam supported by said fulcrum at a point intermediate the ends of said beam for pivotal movement thereabout,
(c) a force applicator engaging one end portion of said beam and urging said beam against said fulcrum and towards rotation thereabout in a predetermined direction,
(d) and permanent magnetic means fixedly mounted adjacent the opposite end portion of said beam and urging the same toward rotation in an opposite direction about said fulcrum,
(e) said opposite end portion of said beam including a magnetically permeable element disposed opposite said magnetic means,
(f) and adjustable spacer means engaging said beam and determining the spacing between said magnetic means and said permeable element whereby the extent of urging of said magnetic means upon said permeable element may be varied.

15. The structure defined in claim 14 wherein said magnetic means is adjustably mounted adjacent said opposite end portion of said beam for movement between various fixed positions spaced longitudinally of said beam.

16. The structure defined in claim 14 and a lever member having one end portion pivotally mounted for free pivotal movement about an axis parallel to the axis of pivotal movement of said balance beam and having a portion thereof spaced from its axis of pivotal movement connected to said force applicator, said lever member being adapted to have a load connected thereto at a point along its length.

17. The structure defined in claim 16 wherein said lever member is adapted to have a load connected at various points along its length.

18. An over and under weighing device comprising,
(a) a fulcrum,
(b) a balance beam supported by said fulcrum at a point intermediate the ends of said beam for pivotal movement thereabout,
(c) a force applicator engaging one end portion of said beam and urging said beam downwardly against said fulcrum and toward rotation thereabout in a predetermined direction,
(d) permanent magnetic means fixedly mounted adjacent the opposite end portion of said beam and urging the same toward rotation in an opposite direction about said fulcrum,
(e) said opposite end portion of said beam including a magnetically permeable element disposed opposite said magnetic means,
(f) conveying means mounted above said balance beam for conveying articles to be weighed thereby,
(g) a lever member mounted for pivotal movement about a fixed axis, which axis extends transversely of said conveying means,
(h) said lever member extending longitudinally of said conveying means and engaging said force applicator in supported relation and urging the same downwardly,
(i) and a pair of weight-supporting elements mounted on said lever member at points spaced longitudinally of said lever member and disposed at the same side of its axis of pivot,
(j) each of said weight supporting elements being disposed and maintained by said lever and said force applicator in position relative to said conveying means to cause the articles conveyed thereby to pass across said elements separately in supported relation thereto.

19. A feeding apparatus comprising,
(a) a container,
(b) a pair of weight sensitive devices arranged in tandem cooperative supporting relation to said container,
(c) each of said devices comprising:
  (1) a fulcrum,
  (2) a balance beam supported by said fulcrum at a point intermediate the ends of said beam for pivotal movement thereabout,
  (3) a force applicator engaging one end portion of said beam and urging said beam downwardly against said fulcrum and toward rotation thereabout in a predetermined direction,
  (4) permanent magnetic means fixedly mounted adjacent the opposite end portion of said beam and urging the same toward rotation in an opposite direction about said fulcrum,
  (5) said opposite end portion of said beam including a magnetically permeable element disposed opposite said magnetic means, and
  (6) an electrical switch mounted adjacent said opposite end portion of said beam in position to be actuated thereby upon upward movement of said opposite end portion,
(d) one of said devices being constructed and arranged to so actuate its electrical switch at a weight of said container slightly less than at which the switch of the other said device will be actuated,
(e) conduit means emptying into said container and adapted to be connected to a source of material from which said container may be at least partially filled,
(f) a valve mounted within said conduit means and movable between open, partially closed, and closed positions,
(g) electrically actuated means electrically connected with the switch of said device the switch of which is actuated at the lower weight, for moving said valve from open to partially open position upon actuation of said switch, and
(h) second electrically actuated means electrically connected with the switch of said other device for moving said valve from partially open to closed position when said last mentioned switch is actuated.

20. A tension sensing device for use in indicating and regulating the tension placed upon elongated material such as thread, cord, cables, yarn, paper strips and the like, said device comprising,
(a) a fulcrum,
(b) a balance beam mounted on said fulcrum at a point intermediate the ends of said beam,
(c) a force applicator engaging one end portion of said beam and urging it towards rotation about said fulcrum in a predetermined direction, (d) permanent magnetic means fixedly mounted adjacent the opposite end portion of said beam and urging the same toward rotation in an opposite direction about said fulcrum, (e) and sheave means connected to said force applicator and adapted to have a strip of such material passed thereover while under tension and in such directions as to transfer the force of said tension to said sheave means and said force applicator whereby said opposite end portion of said beam balance will be forced away from said magnetic means when the tension becomes sufficiently great to overcome the effect of said magnetic means upon said opposite end portion, and (f) electrical indicator means mounted adjacent said opposite end portion of said beam balance and in activated relation thereto whereby indication will be given by said indicator means when the tension on such a strip overcomes the urging of said magnetic means upon said opposite end portion of said beam.

21. A force sensing device comprising:
(a) a fulcrum,
(b) a balance beam supported by said fulcrum at a point intermediate the ends of said beam for pivotal movement thereabout,
(c) a force applicator engaging one end portion of said beam and urging said beam against said fulcrum and toward rotation thereabout in a predetermined direction,
(d) magnetic means mounted adjacent the opposite end portion of said beam and urging the same toward rotation in an opposite direction about said fulcrum,
(e) said opposite end portion of said beam including a magnetically permeable element disposed opposite said magnetic means,
(f) electrical warning mechanisms associated with said balance beam in actuated relation and having actuating portions disposed adjacent said beam in position to be actuated thereby upon rotation of said beam in said predetermined direction, and
(g) adjustable spacer means engaging said beam and determining the spacing between said magnetic means and said permeable element whereby the extent of urging of said magnetic means upon said permeable element may be varied.

22. A force sensing device comprising:
(a) a frame adapted to be held in supported relation,
(b) a fulcrum supported by said frame,
(c) a balance beam pivotally supported at a point intermediate its ends by said fulcrum and unsecured relative to said frame,
(d) a force applicator engaging one end portion of said beam and urging said beam against said fulcrum to urge its associated beam end portion to rotate about said fulcrum in a given direction,
(e) magnetic means mounted adjacent the opposite end portion of said beam and urging the same to rotate in an opposite direction about said fulcrum,
(f) said opposite end portion of said beam including a magnetically permeable element disposed opposite said magnetic means, and
(g) electrical warning mechanism associated with said beam balance in actuated relation, said mechanism including an actuating portion disposed adjacent said beam balance and positioned to be actuated thereby upon rotation of said beam balance in such predetermined directions.

23. A force sensing device comprising:
(a) a frame adapted to be held in supported relation,
(b) a fulcrum supported by said frame,
(c) a balance beam pivotally supported at a point intermediate its ends by said fulcrum and then secured relative to said frame,
(d) a force applicator engaging one end portion of said beam and urging said beam against said fulcrum to urge its associated beam end portion to rotate about said fulcrum at a given direction,
(e) magnetic means mounted adjacent the opposite end portion of said beam and urging the same to rotate in an opposite direction about said fulcrum,
(f) said opposite end portion of said beam including a magnetically permeable element disposed opposite said magnetic means,
(g) adjustable spacer means engaging said beam and determining the spacing between said magnetic means and said permeable element wherein the extent of urging of said magnetic means upon said permeable element may be varied, and
(h) electrical warning mechanism associated with said beam balance in actuated relation, said mechanism including an actuating portion disposed adjacent said beam balance in position to be actuated thereby upon rotation of said beam balance in such predetermined direction.

24. The structure defined in claim 13 and adjustment means carried by said balance beam opposite said actuating portion of said electrical warning mechanism for engaging said actuating portion and varying the effective distance between said actuating portion and said beam balance.

25. A force sensing device comprising:
(a) a frame adapted to be held in supported relation,
(b) a fulcrum supported by said frame,
(c) a balance beam pivotally mounted at a point intermediate its ends upon said fulcrum,
(d) a force applicator engaging one end portion of said beam and urging said beam against said fulcrum and toward rotation thereabout in a predetermined direction,
(e) a lever member connected at one of its end portions to said force applicator and having its opposite end portion pivotally mounted at a fixed position with respect to said applicator,
(f) said lever member being adapted to have a load connected thereto for measurement of the same,
(g) magnetic means mounted adjacent the opposite end portion of said beam and urging the same to rotate in an opposite direction about said fulcrum, and
(h) said opposite end portion of said beam having a magnetically permeable element disposed opposite said magnetic means.

26. A force sensing device comprising:
(a) a fulcrum,
(b) a balance beam supported by said fulcrum at a point intermediate the ends of said beam for pivotal movement thereabout,
(c) a force applicator engaging said beam at one side of said fulcrum and urging said beam against said fulcrum and toward rotation thereabout in a predetermined direction,
(d) magnetic means mounted adjacent said beam at the other side of said fulcrum and urging the same toward rotation in an opposite direction about said fulcrum,
(e) said beam including and carrying a magnetically permeable element disposed opposite said magnetic means, and
(f) a lever member having one end portion pivotally mounted for free pivotal movement about a fixed axis and having a portion thereof spaced from its axis of pivotal movement connected to said force applicator, said lever member being adapted to have a load connected thereto at a point along its length.

27. A weighing device comprising:
(a) a fulcrum,
(b) a balance beam supported by said fulcrum at a point intermediate the ends of said beam for pivotal movement thereabout,
(c) a force applicator engaging one end portion of said beam and urging said beam downwardly against said fulcrum and into rotation thereabout in a predetermined direction, (d) magnetic means mounted adjacent the opposite end portion of said beam and urging the same into rotation in an opposite direction about said fulcrum, (e) said opposite end portion of said beam including a magnetically permeable element disposed opposite said magnetic means, (f) conveying means mounted above said balance beam for conveying articles to be weighed thereby, (g) a lever member mounted for pivotal movement about a fixed axis which axis extends transversely of said conveying means, (h) said lever member extending longitudinally of said conveying means and engaging said force applicator in supported relation and urging the same downwardly, (i) and a pair of weight supporting elements mounted on said lever member at points spaced longitudinally of said lever member and disposed at the same side of its axis of pivot, and (j) each of said weight supporting elements being disposed and maintained by said lever and said force applicator in position relative to said conveying means to cause the articles conveyed thereby to pass across said elements separately in supported relation thereto.

28. An over and under weighing device comprising:
(a) a fulcrum,
(b) a balance beam supported by said fulcrum at a point intermediate the ends of said beam for pivotal movement thereabout,
(c) a force applicator engaging one portion of said beam and urging said beam downwardly against said fulcrum and into rotation thereabout in a predetermined direction,
(d) magnetic means mounted adjacent to and opposite said beam at the opposite side of said fulcrum and urging the same into rotation in an opposite direction about said fulcrum,
(e) a portion of said beam disposed opposite said magnetic means including a magnetically permeable element,
(f) conveying means mounted above said balance beam and conveying articles to be weighed thereby,
(g) lever means mounted for pivotal movement and engaging said force applicator in supported relation and urging the same downwardly, and
(h) a pair of weight supporting elements mounted on said lever means and spaced longitudinally of said conveying means and disposed and maintained in position relative to said conveying means to cause the articles conveyed thereby to pass across said elements separately in supported relation,
(i) each of said weight supporting elements being supported by said lever means with a lever arm of different length.

29. An over and under weighing device comprising:
(a) a fulcrum,
(b) a balance beam supported by said fulcrum at a point intermediate the ends of said beam for pivotal movement thereabout,
(c) a force applicator engaging one portion of said beam and urging said beam downwardly against said fulcrum and into rotation thereabout in a predetermined direction,
(d) magnetic means mounted adjacent and opposite a portion of said beam disposed at the opposite side of said fulcrum and urging said beam into rotation in and opposite direction about said fulcrum,
(e) the portion of said beam being disposed opposite said magnetic means including a magnetically permeable element,
(f) conveying means mounted above said balance beam for conveying said articles to be weighed thereby,
(g) lever means mounted for pivotal movement and engaging said force applicator in supported relation and urging the same downwardly,
(h) and a pair of weight supporting elements mounted on said lever means and disposed and maintained in position relative to said conveying means to cause the articles conveyed thereby to pass across said elements separately in supported relation,
(i) each of said weight supporting elements being supported by said lever means and having a different moment of force which is applied to said lever means.

30. A force sensing device comprising:
(a) a fulcrum,
(b) a balance beam supported by said fulcrum at a point intermediate the ends of said beam for pivotal movement thereabout,
(c) a force applicator engaging one end portion of said beam and urging said beam against said fulcrum and toward rotation thereabout in a predetermined direction,
(d) permanent magnetic means fixedly mounted adjacent the opposite end portion of said beam and urging the same toward rotation in an opposite direction about said fulcrum,
(e) said opposite end portion of said beam including a magnetically permeable element disposed opposite said magnetic means, and
(f) a lever member having one end portion pivotally mounted for free pivotal movement about an axis parallel to the axis of pivotal movement of said balance beam and having a portion thereof spaced from its axis of pivotal movement connected to said force applicator, said lever member being adapted to have a load connected thereto at a point along its length.

31. The structure defined in claim 30 wherein said lever member is adapted to have a load connected thereto at various points along its length.

References Cited in the file of this patent

UNITED STATES PATENTS

| | | |
|---|---|---|
| 1,881,060 | Okey | Oct. 4, 1932 |
| 2,767,576 | Seney | Oct. 23, 1956 |
| 2,844,349 | Hudson | July 22, 1958 |
| 2,860,848 | Weaver et al. | Nov. 18, 1958 |
| 2,925,835 | Monjonnier et al. | Feb. 23, 1960 |
| 2,996,914 | Delehanty | Aug. 22, 1961 |
| 3,017,940 | Baltac | Jan. 23, 1962 |
| 3,083,780 | Swenson | Apr. 2, 1963 |